United States Patent [19]

Ban et al.

[11] 4,197,475

[45] Apr. 8, 1980

[54] DIRECT CURRENT MOTOR WITH DOUBLE LAYER ARMATURE WINDINGS

[76] Inventors: Itsuki Ban, 829 Higashi-Oizumimachi, Nerima-ku, Tokyo; Manabu Shiraki, 4451-171 Shimotsuruma,, Yamato-shi Kanagawa-ken; Kazuhito Egami, 2-44-1 Chuo, Nakano-Ku, Tokyo, all of Japan

[21] Appl. No.: 931,189

[22] Filed: Aug. 4, 1978

[30] Foreign Application Priority Data

Dec. 5, 1977 [JP] Japan .............................. 52-145180

[51] Int. Cl.² .............................................. H02K 23/30
[52] U.S. Cl. ...................................... 310/203; 310/266
[58] Field of Search ............... 310/184, 198, 203, 207, 310/208, 189, 266

[56] References Cited

U.S. PATENT DOCUMENTS

| | | | |
|---|---|---|---|
| 3,209,187 | 9/1965 | Angele | 310/266 |
| 3,324,323 | 9/1967 | Henry-Baudot | 310/203 |
| 3,360,668 | 12/1967 | Faulhaber | 310/266 X |
| 3,532,916 | 10/1970 | Fisher | 310/266 |
| 4,019,075 | 7/1977 | Kagami | 310/207 |

*Primary Examiner*—Donovan F. Duggan
*Attorney, Agent, or Firm*—Kenway & Jenney

[57] ABSTRACT

A direct current motor having armature windings which are superposed on each other in double layers. The motor includes a fixed field magnet having 2mn poles (m being a positive integer of 1 or more, n being a positive integer of 2 or more) which are magnetized alternately to N and S polarities in equal angular spaces, a magnetic material member for closing the magnetic path of the field magnet, a rotating shaft supported by bearings provided in the housing of motor, and an armature which is secured to the shaft for rotation in the magnetic path and facing the field magnet poles. A first series of m(2n+1) armature windings are mounted on the armature and are juxtaposed with respect to each other at equal pitches, the angular spacing between the conductor portions, which contribute to generate torque, of the armature winding being equal to the angular width of the field magnet pole. A second series of m(2n+1) armature windings are also mounted on the armature and are juxtaposed with respect to each other at equal pitches, the angular spacing between the conductor portions, which contribute to generate torque, of the armature winding of the second series also being equal to the angular width of the field magnet pole. The first series of the m(2n+1) armature windings and the second series of the m(2n+1) armature windings are superposed on each other and are disposed, with respect to each other, out of phase by 1/(2n−1) of the angular width of the field magnet pole.

4 Claims, 10 Drawing Figures

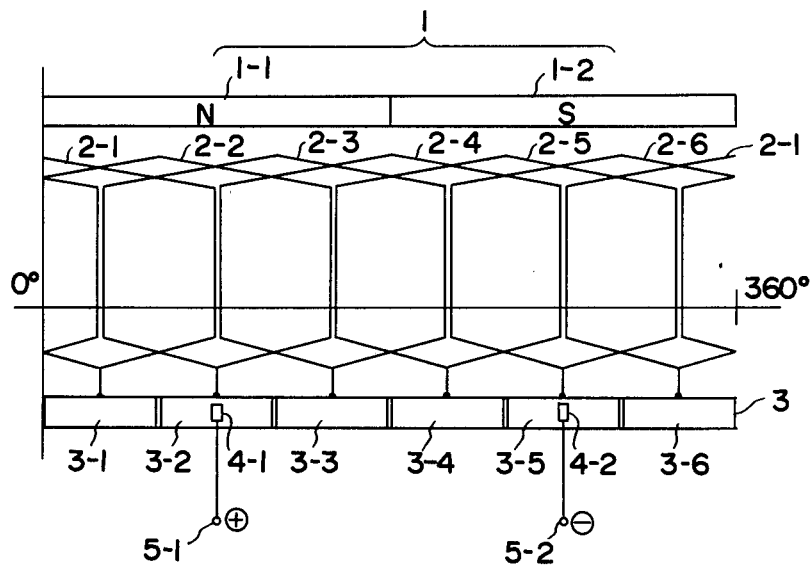
FIG. 1  "PRIOR ART"
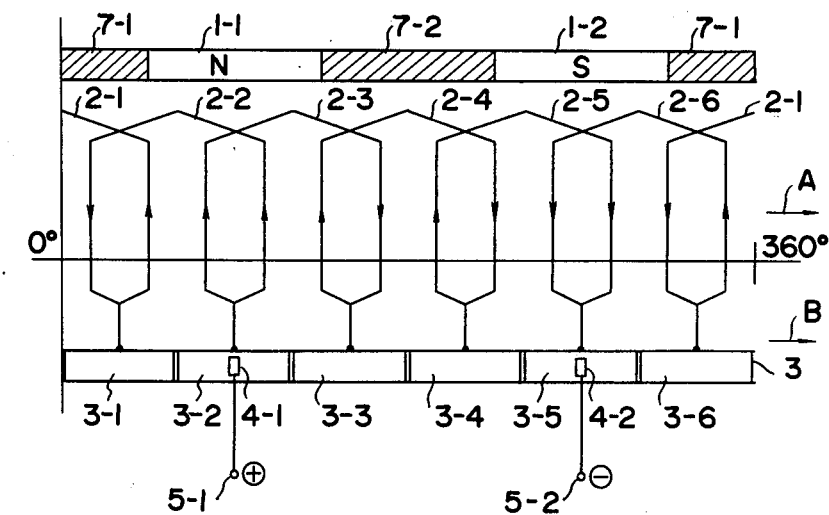
FIG. 2

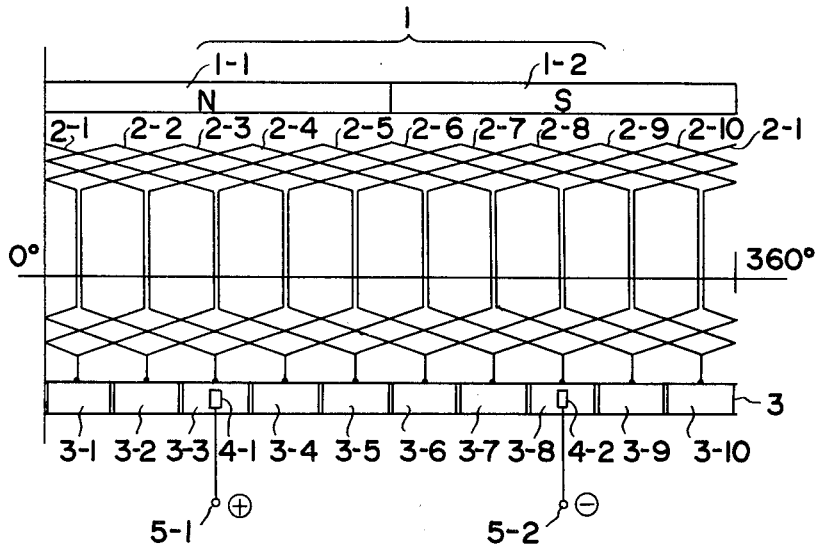
FIG. 3 "PRIOR ART"
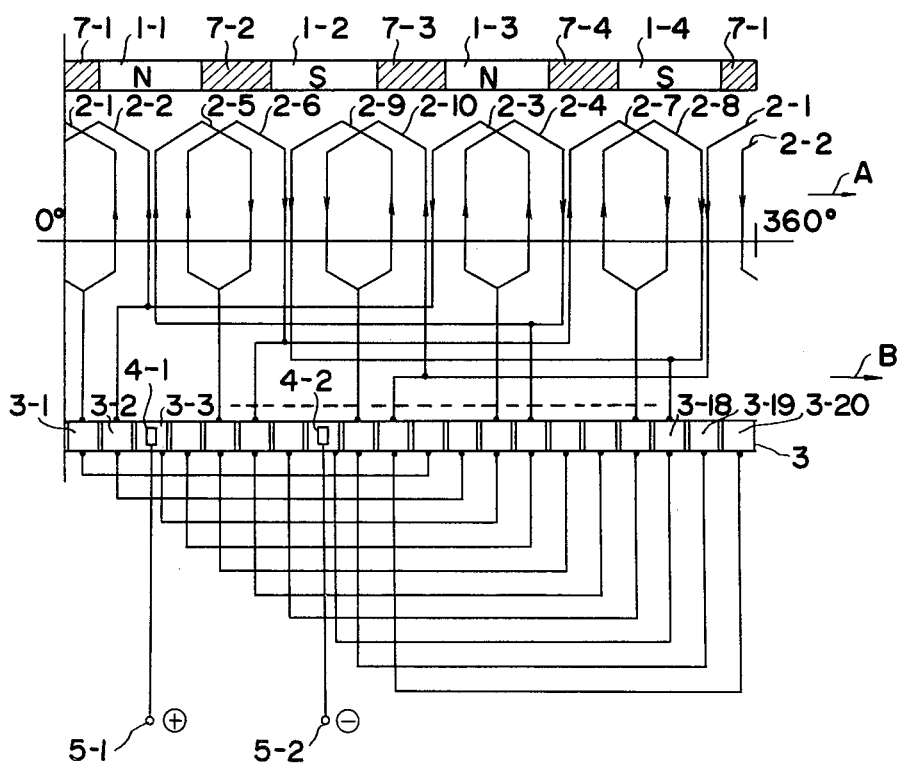
FIG. 4

DIRECT CURRENT MOTOR WITH DOUBLE LAYER ARMATURE WINDINGS

BACKGROUND OF THE INVENTION

This invention relates to a direct current motor having a wound armature provided with a plurality of insulated windings.

It is well known that a direct current (DC) motor provided with a plurality of armature windings formed by lap winding or by wave winding techniques is highly efficient and has better commutating characteristics as the number of armature windings increases. If the conventional manner of lap winding or wave winding is employed in a coreless motor, however, the armature of motor will increase in thickness because the armature windings are superposed on each other in many layers. The increased thickness of the armature will substantially reduce the effective magnetic field of the field magnet passing through the armature, resulting in decreased motor efficiency and decreased motor starting torque. The prior art effort for solving these problems, has been directed to reducing the thickness of the conductor portions, which contribute to generate torque, by specially processing the edge portions of the coils. This processing for reducing the thickness of conductor portions was performed by a working such as press molding and, accordingly, was often accompanied by such as the breaking and short-circuiting of the armature windings. Further, since phase relationship between the armature windings could not be positively held in a desired state at the time the windings were arranged, correct phase relationship between the windings was distorted. Accordingly, it was very difficult to obtain a DC motor having an efficiency which is as high as theoretically expected. In addition, such prior art DC motors could not be mass produced and were costly. In another prior art technique used for conventional cylindrical coreless DC motors, superposition of the edge portions of coils of armature windings on each other was avoided by winding insulated wire in alignment turn by turn so that the entire width of winding, or a part thereof, was slanted with respect to the rotating axis. This technique, however, was also costly and could not be employed for mass production.

SUMMARY OF THE INVENTION

The above-described drawbacks in the prior art motor have been successfully eliminated by the present invention.

Accordingly, an object is the invention is to provide a DC motor which is liable to mass production and of less cost.

Another object of the invention is to provide a DC motor which is high in torque and efficiency, wherein the conventional lap windings or wave windings are developed in a manner that, for 2n (n being a positive integer of 1 or more) of the number of field magnet poles, a first series of (2n+1) armature windings and a second series of (2n+1) armature windings are arranged under regulation by a method, which will be described hereinbelow, so that the armature windings are superposed on each other in only two layers, thus permitting a thinner armature to be made without any special processing.

A further object of the invention is to provide a DC motor which has armature windings superposed on each other in only two layers and wherein the voltage applied between commutator segments is equal to that in a motor having lap or wave armature windings, the generation of sparks between the commutator segments is reduced, short-circuit accidents can be prevented, and increased durability of motor can be obtained.

A still further object of the invention is to provide a DC motor wherein better commutating characteristics can be obtained as the number of commutator segments increases.

A still further object of the invention is to provide a DC motor wherein armature windings can easily be located in an ideal arrangement whereby undesirable out-of-phase between the armature windings can be completely prevented.

According to one embodiment of the invention, there is provided a DC motor which has armature windings superposed on each other in two layers. The motor includes a fixed field magnet having two poles which are magnetized to N- and S-polarities in equal angular spaces, a magnetic material member for closing magnetic path of the field magnet, a rotating shaft supported by bearings provided in the housing of motor, and an armature fixed to the rotating shaft for rotation in the magnetic path and facing the poles of the field magnet. A first series of three armature windings are mounted on the armature in a manner that the angular spacing between conductor portions, which contribute to generate torque, of the winding is equal to the angular width of the field magnet pole and the windings are juxtaposed with respect to each other at equal pitches. A second series of three armature windings are also mounted on the armature in a manner that the angular spacing between the conductor portions, which contribute to generate torque, of the winding is equal to the angular width of the field magnet pole and the windings are juxtaposed with respect to each other at equal pitches. The first series of the three armature windings and the second series of the three armature windings are superposed on each other with 60° phase shift therebetween.

According to another embodiment the invention, there is provided a DC motor which has armature windings superposed on each other in two layers. The motor includes a fixed field magnet having 2 mn poles (m being a positive integer of 1 or more, and n being a positive integer of 2 or more) which are magnetized to N- and S-polarities in equal angular spaces, a magnetic material member for closing magnetic path of the field magnet, a rotating shaft supported by bearings provided in the housing of motor, and an armature fixed to the rotating shaft for rotation in the magnetic path and facing the poles of field magnet. A first series of m(2n+1) armature windings are mounted on the armature in a manner that the angular spacing between the conductor portions, which contribute to generate torque, of the winding is equal to the angular width of the field magnet pole and the windings are juxtaposed with respect to each other at equal pitches. A second series of m(2n+1) armature windings are also mounted on the armature in a manner that the angular spacing between the conductor portions, which contribute to generate torque, of the winding is equal to the angular width of the field magnet pole and the windings are juxtaposed with respect to each other at equal pitches. The first series of m(2n+1) armature windings and the second series of m(2n+1) armature windings are superposed on each other with a phase shift, with respect to each other, of 1/(2n+1) of the angular width of the field magnet pole.

The above and other objects and advantages of the invention will be apparent from the following description of the preferred embodiments taken in conjunction with the accompanying drawings.

BRIEF DESCRIPTION OF THE DRAWINGS

FIG. 1 is a developed view of a prior art DC motor having six lap armature windings;

FIG. 2 is a developed view of an embodiment of the DC motor according to the invention;

FIG. 3 is a developed view of a prior art DC motor having ten lap armature windings;

FIG. 4 is a developed view of another embodiment of the DC motor of the invention;

FIG. 5b is a cross-sectional view of the cylindrical armature of FIG. 5a;

FIG. 7b is a cross-sectional view of the cylindrical armature of FIG. 7a; and

DETAILED DESCRIPTION OF THE PREFERRED EMBODIMENTS

Figure 5A:
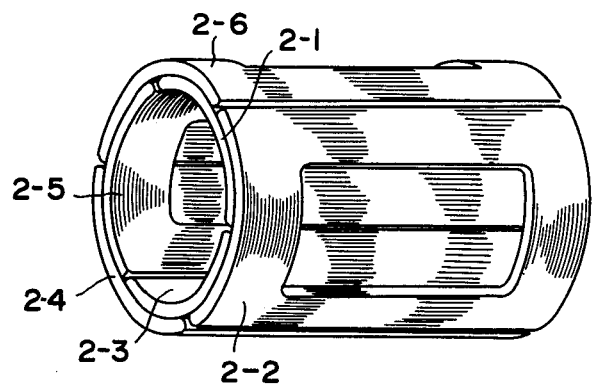
FIG. 5a is a perspective view of a cylindrical armature which is formed in accordance with the development of FIG. 2.

In order that the above-described features of the invention may be better understood, a description of embodiments of commutator motors which employ a specifically constructed cylindrical coreless armature follows. The DC motor of the invention includes a fixed field magnet, a magnetic material member for closing the magnetic path of the field magnet, a rotating shaft supported by bearings in the housing of motor (usually, this housing and the above-mentioned magnetic material member may be one and the same member), and an armature which is fixed to the shaft for rotation in the magnetic path and facing the poles of the field magnet. Although the embodiment will be described as being provided with lap windings, wave windings may be employed in place of the lap windings to achieve the same objects.

FIG. 1 is a development of a conventional DC motor which has two field magnet poles and is provided with six lap armature windings which are shifted in phase from each other. In FIG. 1, the numerals 1-1 and 1-2 indicate field magnet poles which are magnetized, each in 180° angular space, to N and S, respectively, and there are provided armature windings 2-1, 2-2, ..., 2-6 which are shifted when phase by 60° from each other. As is noted from the figure, in the conventional technique is employed, these armature windings must be mounted on the armature is six superposed layers. Accordingly, substantial labor is required for processing the edge portions of the coils. This is an obstacle to mass production. On the other hand, if six windings which have been molded and solidified into a unit are mounted on the armature, the resultant armature assembly will be of increased thickness because the windings are superposed on each other in six layers. Such increased thickness will substantially reduce the effective magnetic field of the field magnet and result through the armature resulting in decreased efficiency and decreased starting torque. The angular space of each of the armature windings 2-1, 2-2, ..., 2-6 is 180° which is equal to the angular width of the field magnet poles 1-1, 1-2. A commutator 3 consists of commutator segments 3-1, 3-2, ..., 3-6, each having an angular space of 60° (⅙ of the angular width of the field magnet pole). The numerals 4-1 and 4-2 indicate brushes which are adapted to receive current respectively from the positive and negative terminals 5-1 and 5-2 of a DC supply source. The brushes 4-1 and 4-2 are angularly spaced from each other by 180° which is equal to the angular width of the field magnet pole.

A first embodiment of DC motor of the invention will now be described in conjunction with the development of FIG. 2. In FIG. 2, the numerals 1-1 and 1-2 indicate field magnet poles which are, each in about 90° angular space, magnetized respectively to N and S. The numerals 7-1 and 7-2 indicate portions which have no or weak magnetic field and are disposed, each in about 90° angular space, alternately with the field magnet poles 1-1 and 1-2. By employing such non- or weak-magnetic-field portions 7-1, 7-2, the field magnet poles 1-1, 1-2 are each magnetized in about 90° angular space though they are two in the number of poles. In case of the conventional lap winding, as shown in FIG. 1, under the poles 1-1 and 1-2, which are magnetized in 180° angular space, there are arranged all the armature windings 2-1, 2-2, ..., 2-6 with an angular space which is equal to the anguair width of the field magnet pole. Accordingly the armature windings are superposed in multiple layers. However, by providing two field magnet poles which each have about 90° angular width, and by making the angular spacing between the conductor portions, which contribute to generate torque, of each of the armature windings 2-1, 2-2, ..., 2-6 90° or equal to the angular width of the field magnet pole, the armature windings may be superposed in two layers, and the resultant motor will rotate the same manner as in a conventional lap winding motor. A first series of the armature windings 2-1, 2-3, 2-5 are juxtaposed with respect to each other at equal pitches and with angular spaces of 120°.

Similarly, a second series of the armature windings 2-2, 2-4, 2-6 are juxtaposed with respect to each other at equal pitches and with angular spaces of 120°. The first series of armature windings 2-1, 2-3, 2-5 and the second series of armature windings 2-2, 2-4, 2-6 are superposed on each other with 60° phase shift therebetween. The order of interconnections of the armature windings shown in FIG. 2 is the same as that in FIG. 1. They are interconnected in the order of 2-1, 2-2, ..., 2-6, the termination end of a preceeding winding being connected to the start of the succeeding winding, and the respective interconnection junctures being connected to corresponding commutator bars, as shown in FIG. 2. A commutator 3 consists of commutator segment 3-1, 3-2, ..., 3-6, each having a 60° angular space. The numerals 4-1 and 4-2 indicate brushes which are adapted to receive current respectively from the positive and negative terminals 5-1 and 5-2 of a DC supply source. The brushes 4-1 and 4-2 are 180° angularly spaced from each other. In the state shown in FIG. 2, current flows in the direction shown by the arrows, and torque is generated at every armature winding thereby to drive the armature in the direction of arrow A. Accordingly, the commutator 3 also rotates in the direction of arrow B and, consequently, current circulates through the armature windings with its direction being changed by the turns.

Figure 5B:
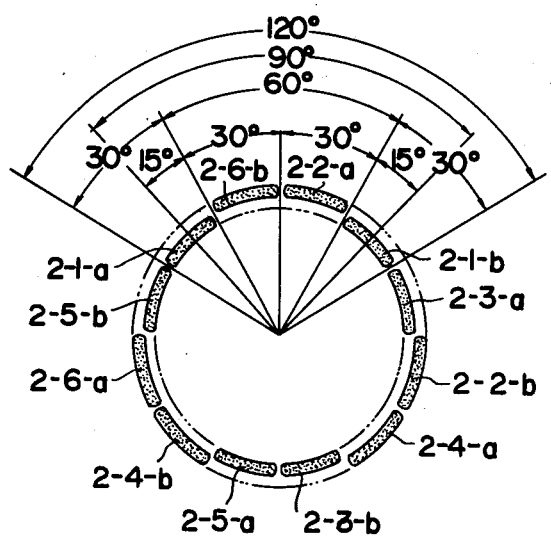

FIG. 5a is a perspective view of a cylindrical armature which is formed in accordance with the development shown in FIG. 2, and FIG. 5b shows a cross section of the armature of FIG. 5a. In FIG. 5b, the numerals 2-1-a and 2-1-b indicate cross-sections of the conductor portions, which contribute to generate torque, of the armature winding 2-1. Similarly, the numerals 2-2-a, 2-2-b, and 2-3-a, 2-3-b, and 2-4-a, 2-4-b, and 2-5-a, 2-5-b, and 2-6-a, 2-6-b indicate cross-sections of the conductor portions, respectively of the armature windings 2-2, 2-3, 2-4, 2-5, and 2-6. The first series of armature windings 2-1, 2-3, 2-5 are juxtaposed with respect to each other and are located on the inner side of the cylindrical armature. The angular spacing between the center radial lines of the conductor portions, of each winding is 90° which is equal to the angular width of field magnet pole, while the angular spacing between the radial lines at the outside ends of such conductor portions is 120°. These three armature windings are juxtaposed with respect to each other. The second series of armature windings 2-2, 2-4, 2-6 are arranged in a similar manner to the first series of armature windings and are located on the outer side of the cylindrical armature. The group of the armature windings belonging to the first series and the group of the armature windings belonging to the second series are superposed on each other with a 60° phase shift therebetween, thus forming a double-layer cylindrical armature. Further, the vacant or non-wound portions of the 60° angular space of the armature winding 2-1, which are located on the inner side of the armature, and the sections 2-6-b, 2-6-a, which are located on the outer side of the armature, are positioned in an angularly coincidential relationship with respect to each other. Similarly, the vacant portions of the armature winding 2-3 and the sections 2-2-b, 2-4-a are in an angularly coincidential relationship and, likewise the vacant portions of the armature winding 2-5 and the sections 2-4-b, 2-6-a are in an angularly coincidential relationship. Thus, the armature windings can be easily disposed with respect to each other in an ideal positional relationship and, accordingly, undesirable out-of-phase between the windings can be perfectly avoided. Accordingly, by resin molding the armature windings into a cylindrical armature, a DC motor having a very high efficiency can easily be obtained.

Figure 6:
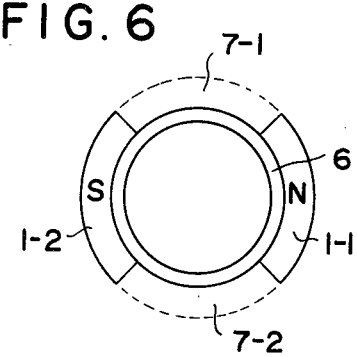
FIG. 6 is a cross-sectional view illustrating field magnet poles which are formed in accordance with the development of FIG. 2.

FIG. 6 is a cross sectional view of field magnet poles which are formed into a cylindrical assembly in accordance with the development shown in FIG. 2. Within this cylindrical magnet pole assembly is coaxially located the cylindrical armature of FIG. 5 with an air gap therebetween. In FIG. 6, the N magnet pole piece 1-1 and the S magnet pole piece 1-2, each having about 90° angular space, are located opposite to each other with the non- or weak-magnetic-field portions 7-1 and 7-2 of about 90° angular space interposed therebetween. The pole pieces 1-1, 1-2 are magnetized on the outer periphery in the radial direction. The numeral 6 indicates a cylindrical iron member which supports the field magnet pole pieces 1-1, 1-2 attached thereto and forms parts of the magnetic path produced by the field magnet.

While the above-described embodiment of DC motor of the invention includes two field magnet poles and six armature windings, the objects of the invention can be accomplished also by another embodiment which employs four field magnet poles and ten armature windings. Such other embodiment will not be described.

First, reference will be made to a conventional lap winding DC motor which has two field magnet poles and ten armature windings which are phase shifted from each other, as shown in the development of FIG. 3. In FIG. 3, the numerals 1-1, 1-2 indicate field magnet poles which are magnetized respectively to N and S in a 180° angular space, and there are provided armature windings 2-1, 2-2, . . . , 2-10 with phase shifts of 36° therebetween. If the conventional technique is employed, these armature windings will be mounted on an armature in a manner that the windings are superposed on each other in ten layers. The angular space of each of the armature windings 2-1, 2-2, . . . , 2-10 is 180° which is equal to the angular width of the field magnet poles 1-1, 1-2. A commutator 3 consists of commutator segments 3-1, 3-2, . . . , 3-10, each having a 36° angular space (1/5 of the angular width of the field magnet pole). The numerals 4-1, 4-2 indicate brushes which are adapted to receive current from the positive and negative terminals 5-1 and 5-2 of a DC supply source. The brushes 4-1 and 4-2 are angularly spaced from each other by 180° which is equal to the angular width of the field magnet pole.

The above-mentioned other embodiment of DC motor of the invention will now be described in conjunction with the development shown in FIG. 4. In FIG. 4, the numerals 1-1, 1-2, 1-3 and 1-4 indicate field magnet poles which are magnetized alternately to N and S in about 54° angular space. The numerals 7-1, 7-2, 7-3 and 7-4 indicate portions which have about 36° angular space each and have no or weak magnetic field. The poles 1-1, 1-2, 1-3, 1-4 and the portions 7-1, 7-2, 7-3, 7-4 are arranged alternately one by one. By employing the non- or weak-magnetic-field portions 7-1, 7-2, 7-3, 7-4, the field magnet poles are magnetized in about 54° angular space each though they are four in the number of poles. In case of the conventional lap winding DC motor, as shown in FIG. 3, under the field magnet poles 1-1, 1-2, which are magnetized in 180° angular space, there are arranged all the armature windings 2-1, 2-2, . . . , 2-10, each having an angular space which is equal to the angular width of the field magnet pole. Accordingly, the armature windings must be superposed on each other in many layers. However, if four field magnet poles of about 54° angular width are employed, and, the armature windings 2-3, 2-4 are shifted rightward by 180°, and the armature windings 2-7, 2-8 are shifted rightward by 180°, as shown in FIG. 4, so that the windings are under the field magnet poles of the same polarity as in FIG. 3. The direction of output torque will not be changed from that in FIG. 3 and, accordingly, the resultant DC motor will rotate in the same manner as the conventional lap winding motor. In the arrangement of FIG. 4, of course, the armature windings which would otherwise be located under the poles 1-3, 1-4, are omitted. The angular spacing between conductor portions, which contribute to generate torque, of each of the armature windings 2-1, 2-2, . . . , 2-10 is about 54° which is equal to the angular width of the field magnet pole. A first series of the armature windings 2-1, 2-5, 2-9, 2-3, 2-7 are juxtaposed, each in a 72° angular space, with respect to each other and at equal pitches. Similarly, a second series of the armature windings 2-2, 2-6, 2-10, 2-4, 2-8 are juxtaposed, each in a 72° angular space, with respect to each other and at equal pitches. The first series of windings 2-1, 2-5, 2-9, 2-3, 2-7 and the second series of windings 2-2, 2-6, 2-10, 2-4, 2-8 are superposed on each other with a 18° phase shift therebetween. The order of interconnections of the armature windings in FIG. 4 is the same as in FIG. 3. They are interconnected in the order of the windings 2-1, 2-2, ..., 2-10, the termination end of a preceeding winding being connected to the start of the succeeding winding, and the interconnection junctures of the windings are connected to corresponding commutator segments as shown in FIG. 4. A commutator 3 consists of commutator segments 3-1, 3-2, ..., 3-20, each having an angular space of 18°. Respective pairs of the commutator segments 3-1, 3-11, segments 3-2, 3-12, segments 3-3, 3-13, segments 3-4, 3-14, segments 3-5, 3-15, segments 3-6, 3-16, segments 3-7, 3-17, segments 3-8, 3-18, segments 3-9, 3-19, and segments 3-10, 3-20 are respectively interconnected through respective lead wires. The numerals 4-1 and 4-2 indicate brushes which are adapted to receive current respectively from the positive and negative terminals 5-1 and 5-2 of a DC supply source. The angular spacing between the brushes 4-1 and 4-2 is 90° (360°/2mn, where m and n are each a positive integer of 1 or more, while m=1, n=2 in this case). In the state shown in FIG. 4, current flows through the windings in the direction shown by the arrows, and torque is generated at the respective armature windings to drive the armature in the direction of arrow A. Consequently, the commutator 3 also rotates in the direction of arrow B and, accordingly, current circulates through the armature windings while changing in direction by the turns. However, in this embodiment of DC motor of the invention, for one cycle of current circulation, the armature rotates 180°. To obtain 360° rotation of the armature, three cycles of current circulation are required. In this respect, it is noted that, in the commutator segments 3-1, 3-2, ..., 3-20, each pair of the segments which are 180° phase shifted from each other are interconnected for circulation of current.

Figure 7A:
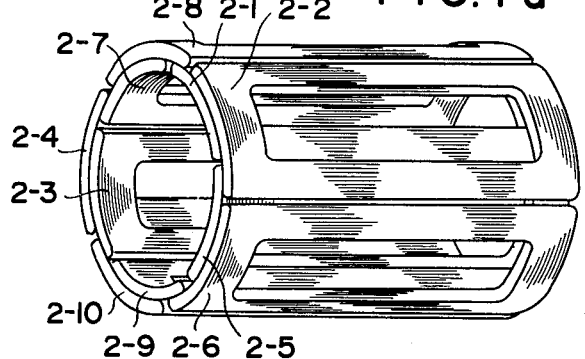
FIG. 7a is a perspective view of a cyclindrical armature which is formed in accordance with the development of FIG. 4.
Figure 7B:
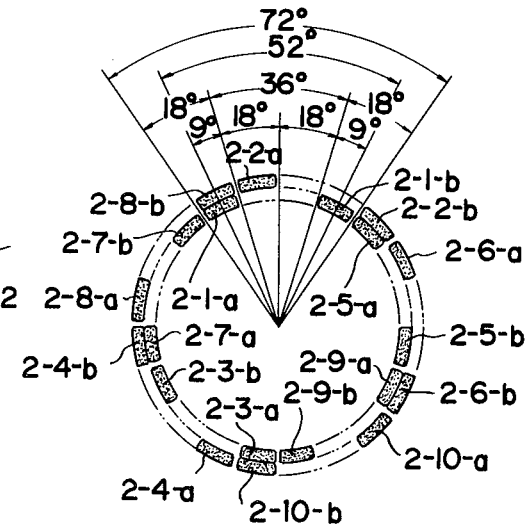

FIG. 7a is a perspective view of a cylindrical armature formed in accordance with the development of FIG. 4, and FIG. 7b shows a cross section of the cylindrical armature of FIG. 7a. In FIG. 7b, the numerals 2-1-a and 2-1-b indicate cross-sections of the conductor portions, which contribute to generate torque, of the armature winding 2-1. Similarly, the numerals 2-2-a and 2-2-b, the numerals 2-3-a and 2-3-b, the numerals 2-4-a and 2-4-b, the numerals 2-5-a and 2-5-b, the numerals 2-6-a and 2-6-b, the numerals 2-7-a and 2-7-b, the numerals 2-8-a and 2-8-b, the numerals 2-9-a and 2-9-b, and the numerals 2-10-a and 2-10-b indicate cross-sections of conductor portions, respectively of the armature windings 2-2, 2-3, 2-4, 2-5, 2-6, 2-7, 2-8, 2-9, and 2-10. The armature windings 2-1, 2-5, 2-9, 2-3, 2-7 from a first series of armature windings which are juxtaposed with respect to each other and are located on the inner side of the armature. The angular spacing between these radial center lines of the conductor portions, of each armature winding of the first series is 54°, The angular spacing between the radial lines at the outside ends of these armature winding is 72°. Thus, the five armature windings of the first series are juxtaposed with respect to each other. Similarly, the armature windings 2-2, 2-6, 2-10, 2-4, 2-8 form a second series of armature windings, are juxtaposed with respect to each other and are located on the outer side of the armature with the same angular spacings as those in the first series of armature windings. The group of the armature windings located on the inner side of the armature and the group of the armature windings located on the outer side of the armature are superposed on each other in two layers with a 18° phase shift therebetween, thus forming a cylindrical armature. As will be seen from the above-described arrangement, each pair of the sections 2-1-a and 2-8-b, the sections 2-5-a and 2-2-b, the sections 2-9-a and 2-6-b, the sections 2-3-a and 2-10-b, and the sections 2-7-a and 2-4-b are superposed on each other in a perfectly coincident relationship, one section of the pair being on the inner side and the other section being on the outer side. Thus, the armature windings can be easily disposed with respect to each other in an ideal positional relationship and, accordingly, undesirable out-of-phase between the windings can be perfectly avoided. Accordingly, by resin molding the armature windings into a cylindrical armature, a DC motor having a very high efficiency can be easily obtained. Where jigs are used for angularly positioning the armature windings, the jigs will be inserted into common vacant spaces of the inside group of windings and the outside group of windings (18° anglar space in this embodiment), thereby to prevent undesirable out-of-phase between the windings.

Figure 8:
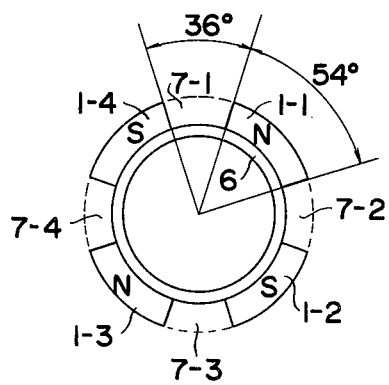
FIG. 8 is a cross-sectional view illustrating field magnet poles which are formed in accordance with the development of FIG. 4.

FIG. 8 shows a cross section of a cylindrical field magnet which is formed in accordance with the development shown in FIG. 4, wherein the cylindrical armature shown in FIG. 7 is coaxially located in this field magnet with an air gap therebetween. The field magnet shown in FIG. 8 comprises N and S pole pieces 1-1, 1-2, 1-3, 1-4, each having about 54° angular space, and the non- or weak-magnetic-field portions 7-1, 7-2, 7-3, 7-4, each having about 36° angular space. The pole pieces and the non- or weak-magnetic-field portions are alternately disposed. The pole pieces 1-1, 1-2, 1-3, 1-4 are magnetized on the outer periphery in the radial direction. The numeral 6 indicates a cylindrical iron member which supports the field magnet pole pieces 1-1, 1-2, 1-3, 1-4 attached thereto and also forms parts of the magnetic path produced by the field magnet.

While the above-described second embodiment of the invention is provided with four field magnet poles and ten armature windings, the objects of the invention can also be attained, by providing 2n field magnet poles (n being a positive integer of 2 or more) and 2(2n+1) armature windings, or by providing 2mn field magnet poles (m being a positive integer of 1 or more) and 2m(2n+1) armature windings (m being a positive integer of 1 or more), wherein all the armature windings are superposed on each other in two layers. Further, while, in the above-described first and second embodiments, the motors employ a cylindrical coreless armature wherein current is supplied to the armature by means of the commutator and the brushes, a disc type armature can alternatively be employed with the same effects. Further, the invention can also be employed in a core-type motor and in a motor of the type wherein current is supplied to armature windings by means of semiconductor devices.

While the invention has been described in connection with the preferred embodiments, it is to be understood that various changes and modifications can be made without departing from the spirit and scope of the invention.

What is claimed is:

1. A direct current motor having armature windings superposed on each other in double layers comprising: a fixed field magnet having two poles which are magnetized respectively to N and S polarities at equal angular spaces; a magnetic material member for closing the magnetic path of said field magnet; a rotating shaft supported by bearing means provided in a housing of said motor; an armature fixed to said shaft and adapted to rotate in said magnetic path facing said field magnet poles; a first series of three armature windings mounted on said armature, said armature windings of said first series being juxtaposed with respect to each other at equal pitches, the angular spacing between conductor portions of each of said windings being equal to the angular width of each said field magnet pole; and a second series of three armature windings mounted on said armature, said armature windings of said second series juxtaposed with respect to each other at equal pitches, the angular spacing between conductor portions of each of said armature windings of said second series being equal to the angular width of each said field magnet pole; said first series of the three armature windings and said second series of the three armature windings being superposed on each other with a 60° phase shift therebetween.

2. A direct current motor according to claim 1 wherein terminals of said armature windings of said first and second series are connected respectively to corresponding ones of six commutator segments, said motor further including brushes which are adapted to receive current from a positive and negative terminals of a supply source and to slidingly contact with said commutator segments, the angular spacing between said brushes being 180°.

3. A direct current motor having armature windings superposed on each other in double layers comprising: a fixed field magnet having 2mn poles which are magnetized alternately to N and S polarities at equal angular spaces, wherein m is a positive integer of 1 or more and n is a positive integer of 2 or more; a magnetic material member for closing the magnetic path of said field magnet; a rotating shaft supported by bearing means provided in a housing of said motor; an armature fixed to said shaft and adapted to rotate in said magnetic path facing said field magnet poles; a first series of $m(2n+1)$ armature windings mounted on said armature, said armature windings of said first series being juxtaposed with respect to each other at equal pitches, the angular spacing between conductor portions of each of said armature windings being equal to the angular width of each said field magnet pole; and a second series of $m(2n+1)$ armature windings, said armature windings of said second series being juxtaposed with respect to each other at equal pitches, the angular spacing between conductor portions of each of said armature windings of said second series being equal to the angular width of each said field magnet pole; said first series of the $m(2n+1)$ armature windings and said second series of the $m(2n+1)$ armature windings being superposed on each other with a phase shift with respect to each other of $1/(2n+1)$ of the angular width of each said field magnet pole.

4. A direct current motor according to claim 3 wherein terminals of said armature windings of said first and second series are connected respectively to corresponding ones of $2mn(2n+1)$ commutator segments, said commutator segments being interconnected in common mn by mn, said motor further including brushes which are adapted to receive current from a positive and a negative terminals of a supply source and to slidingly contact with ones of said armature segments, the angular spacing between said brushes being equal to the angular spacing between said ones of the commutator segments which is 360°/2mn or equal to the angular spacing between the commutator segments which are interconnected in common respectively with said ones of the commutator segments.

* * * * *

UNITED STATES PATENT AND TRADEMARK OFFICE
CERTIFICATE OF CORRECTION

PATENT NO. : 4,197,475
DATED : April 8, 1980
INVENTOR(S) : Ban et al.

It is certified that error appears in the above-identified patent and that said Letters Patent are hereby corrected as shown below:

Col. 1, line 29, delete "such as".
Col. 1, line 52, delete "liable to" and insert therefor --capable of--.
Col. 3, line 1, delete "1/(2n + 1)" and insert therefor --1/(2n - 1)--.
Col. 3, line 59, delete "when" and insert therefor --in--.
Col. 3, line 60, delete "in" and insert therefor --when--.
Col. 4, line 3, after "magnet" insert --passing--.
Col. 4, line 3, delete "and result".
Col. 4, line 4, delete "resulting" and insert therefor --and result--.
Col. 6, line 2, delete "not" and insert therefor --now--.
Col. 7, line 52, delete "from" and insert therefor --form--.
Col. 10, line 19, delete "1/(2n + 1)" and insert therefor --1/(2n - 1)--.

Signed and Sealed this

Eighth Day of July 1980

[SEAL]

Attest:

SIDNEY A. DIAMOND

Attesting Officer

Commissioner of Patents and Trademarks